United States Patent Office 3,391,846
Patented July 9, 1968

3,391,846
HEATING WITH ANTIFERROMAGNETIC PARTICLES IN A HIGH FREQUENCY MAGNETIC FIELD
Jerome R. White, Wilmington, Del., assignor to E. I. du Pont de Nemours and Company, Wilmington, Del., a corporation of Delaware
No Drawing. Continuation-in-part of applications Ser. No. 302,489, Aug. 8, 1963, and Ser. No. 316,542, Oct. 16, 1963. This application Apr. 2, 1964, Ser. No. 356,957
20 Claims. (Cl. 229—17)

ABSTRACT OF THE DISCLOSURE

A method of coating, laminating, sealing cartons and the resulting product involving heating a coating or adhesive containing multi domain antiferromagnetic particles by exposure to an alternating magnetic field of at least 10 megacycles per second.

Cross references

This application is a continuation-in-part of applications Ser. Nos. 302,489 filed Aug. 8, 1963 and 316,542 filed Oct. 16, 1963 and now abandoned.

Background

In many processes for heating heat-activatable materials, it is desired to have complete control of the degree of heating, the precise location of heating and the rate and duration of the heating and cooling cycles. One such process involves heat-sealing flexible substrates such as paper, paperboard, glassine, etc. having coated thereon a heat-activatable protective adhesive organic coating, to thereby form cartons or other containers, such as milk cartons, or cartons or packages for other food products. In such a process the amount or degree of heating is important. Excessive heat will destroy or damage the organic coating and/or char the substrate. Also the coating may melt throughout the entire layer and diffuse into the porous substrate, thus destroying the adhesive effectiveness thereof. Insufficient heating will not properly activate the coating thus prohibiting the formation of adherent bonds. The location of the heating is important since it is only necessary to heat the coating in the precise areas where the coating must be activated, such as in the area of overlapping flaps. In some processes it is absolutely critical that the heat-activatable material not be heated except in certain precise areas. The rate and duration of the heating and cooling cycles is also important. If the rate and duration of heating are too long, the process will be forced to operate at an undesirably slow pace to permit adequate heating. Similarly, if the rate of cooling is too long, the individual work pieces cannot be immediately stacked or placed adjacent to other surfaces, thus hampering the rate of output of the process. On the other hand, if the duration of heating is too short, the coating will not be properly activated. Similar problems are encountered in other processes for heating other heat-activatable materials.

Practitioners of the art have proposed several processes for heating heat-activatable materials where such problems are encountered. However, no completely satisfactory methods have heretofore been devised. For example, U.S. Patent 2,393,541, issued to Kohler, describes a technique whereby conductive metal particles are dispersed in the heat-activatable material which is applied to a substrate as desired. The assembly is then subjected to a magnetic field causing the metal particles to heat, primarily by hysteresis losses, thereby activating the heat-activatable material. While this technique, as described, is suitable for many purposes, the rate of heating the metal particles is inherently unduly slow, requiring several minutes to properly heat the heat-activatable material. Thus, this technique is not suitable for high speed, mass production processes.

Another technique is described in U.S. Patent 2,457,-758, issued to Vore, whereby heat-sealable surfaces may be activated by providing an electrically conductive band of metal particles in contact with the heat-sealable surfaces, which is then subjected to an electromagnetic field. The electrically conductive band is heated by inductive heating (eddy current losses), which activates the heat-sealable surfaces. Again, this technique, as described, is suitable for many purposes. The electrically conductive band is heated in a fraction of a second, provided it is heavily loaded with the electrically conductive metal particles. However, it is difficult to control the degree of heating using this technique, since by inductive heating, the temperature of the metal particles continues to rise above Curie point thereof. This in turn, can lead to degradation of the heat-activatable material, resulting in charring of the substrate, and other undesirable effects.

An object of this invention is to provide an improved process for heating heat-activatable materials. Another object is to provide an improved process for heating heat-activatable materials using an alternating magnetic field. A further object is to provide an improved process for heating heat-activatable materials using an alternating magnetic field, which provides complete control of the degree of heating, the precise location of heating and the rate and duration of the heating and cooling cycles. An additional object is to provide a structure comprising a heat-activatable material which structure is adapted for use in such processes.

Summary

These and other objects are fully attained by the present invention which provides the process of heating a heat-activatable material comprising contacting said material with finely-divided nonconductive antiferromagnetic particles and while in contact, subjecting said material and said particles to an alternating magnetic field of at least 10 megacycles per second.

Detailed description

The terminology used to describe the magnetic properties of materials, unfortunately, is not uniform in the literature. Antiferromagnetic materials, as contemplated in this invention, are defined and distinguished from other materials in Waldron, Ferrites, D. Van Nostrand Company, Ltd., London (1961), p. 31, and Van Der Ziel, Solid State Physical Electronics (1957), pp. 552–553. It has been noted that these antiferromagnetic materials generally are uncompensated, as explained in the cited Van Der Ziel reference.

These antiferromagnetic materials are sulfides, oxides and mixtures of oxides of chromium, manganese, iron, cobalt, and nickel, either alone or together with oxides or mixtures of oxides of the alkali metals (i.e., lithium, sodium, potassium, and rubidium), alkaline earth metals (i.e., beryllium, magnesium, calcium, strontium, barium, and radium), rare earth metals (i.e., lanthanum and the other elements of atomic numbers 57 to 71 of the periodic table), and other metals, such as copper, zinc, vanadium, titanium, and aluminum, wherein the compound has certain crystal structures, in particular, a spinel, garnet, perovskite, or pyrrhotite crystal structure. The preferred antiferromagnetic materials are the ferrites, that is, the oxides and mixtures of oxides of chromium, manganese, iron, cobalt, and nickel either alone or in combination with the other metals, described above, wherein the compound has the spinel crystal structure. These materials are all familiar to those skilled in the art. Cf. Smit and Wijn, "Ferrites," p. 136 (1959); Waldron, "Ferrites" (supra) at pp. 30–35; U.S. Patents 2,452,529 to 2,452,531, issued Oct. 26, 1948 to J. L. Snoek; U.S. Patent 2,886,529, issued May 12, 1959 to C. L. Guillaud; and Van Der Ziel, Solid State Physical Electronics (supra), at p. 555.

These antiferromagnetic materials are electrically nonconductive, that is, they have electrical resistance of at least $10^{-2}$ ohm-cm. These materials typically have electrical resistances of up to $10^9$ ohm-cm., and higher.

It is critical that the antiferromagnetic material be finely divided. However, it is also essential that these particles be multidomained, that is, each particle must contain more than one, and preferably many, "Bloch walls" which separate regions of magnetization, and which are termed "domains." These domains are thin laminar transition regions in which the magnetization changes from the direction existing outside the wall on one side to the direction existing on the outside of the other side of this wall, the directions differing by either 180 or 90 angular degrees. Thus the lower limit on particle size is determined by the factor that the particle must be multidomained. The precise size of the domain varies with different materials. Particles on the order of 0.01 micron in size have been known to be multidomained. The particles may be as large as about 5 microns in size. Preferably, the particles range from 0.1 to 5 microns in size. Particle size is critical to this invention, primarily to insure proper heating characteristics, but also to obtain proper suspension of the particles in a liquid medium, and to render the coating of such particles smooth to the touch.

It should be noted that these antiferromagnetic materials, inherently, are extremely friable. Therefore, ordinary grinding equipment, such as a ball-mill, may be used to conveniently obtain the requisite finely-divided particle sizes. By way of contradistinction, the conductive metal particles used heretofore are far less friable. When these previously used conductive metals are reduced in size, the particles fuse together, or "smear," as they approach the size of the finely-divided particles used in this invention. In fact, it is extremely difficult to obtain particles of conductive metals less than about 75 microns in size. A few complicated methods are available for producing such finely-divided conductive metal particles such as particular complex chemical precipitations in liquid media, and by vapor deposition onto a fluid surface. However, these latter techniques, obviously, are totally unsuitable in uses such as contemplated for the present invention.

For convenience, these finely-divided multidomain nonconductive antiferromagnetic particles are referred to hereinafter as "antiferromagnetic particles."

The Néel temperature of the antiferromagnetic material determines the maximum temperature to which the material is heated upon subjection to an alternating magnetic field, that is, once the material reaches its specific Néel temperature the magnetic effects cease, and the temperature of material will not be raised further. This effect is similar to that known in the art which is associated with the Curie temperature of ferrromagnetic metals. However, the antiferromagnetic materials typically have a much more abrupt transition at their Néel temperature than do the metals at their Curie temperature. Furthermore, the antiferromagnetic materials generally possess a relatively high and uniform permeability over the whole temperature range from room temperature to the Néel temperature so that considerable heating is produced at all temperatures between the starting temperature and the desired final temperature. This results in both extremely rapid heating and fine temperature control.

Thus, the degree or amount of heating is precisely controlled by selection of an antiferromagnetic material having a particular Néel temperature. Such materials are commercially available having various Néel temperatures, and therefore, selection of the proper antiferromagnetic material is within the ordinary skill of practitioners of the art. Normally, it is necessary to select an antiferromagnetic material having a Néel temperature of at least the activation temperature of the heat-activatable material to be heated. The upper temperature is limited only by the degradation temperature of the heat-activatable material and/or the degradation temperature of any substrate or other adjacent bodies.

The alternating magnetic field must have a frequency of at least 10 megacycles per second, or preferably 40 to 2500 megacycles. Ordinary conductive metal particles as used in prior art processes are magnetically responsive, i.e., become heated, when subjected to an alternating magnetic field in the kilocycle per second range, or one megacycle at the most. However, the antiferromagnetic particles used in this invention are not sufficiently responsive to such frequency, heretofore considered "high frequency." Instead, they must be subjected to a field having a frequency at at least 10 megacycles per second in order to heat at a practical rate. The particles reach their Néel temperature within milliseconds upon subjection to such extremely high frequencies, whereas the ordinary conductive metal particles may require on the order of several minutes to heat. Upon removal from, or disruption of, the magnetic field, the particles cool to room temperature, again within milliseconds.

It should be noted that the conductive metals used in the art heretofore in conjunction with relatively low frequency magnetic radiation, are for all practical purposes, completely inoperable in the present invention which employs the extremely high frequency alternating magnetic field of at least 10 megacycles per second and preferably, at least 40 megacycles per second. Upon subjection to such frequencies, the conductive metal particles spark, resulting in tracking, charring of the substrate and nonuniform heat patterns.

In passing, it is also noted that the density of the conductive metals used in the art heretofore generally is about twice that of the antiferromagnetic materials used in this invention. Consequently, the prior art conductive metal particles are difficult to suspend in a liquid medium to produce a satisfactory ink or the like.

To insure optimum efficiency, the magnetic field must have a flux density of at least 50 gauss, with 50 to 500 gauss being the normal operating range, and 100 to 300 gauss being the preferred range.

This invention provides a unique heat source for a wide variety of heat-activatable materials. The term "heat-activatable materials" refer to materials which can be heated to a particular temperature to secure a practical accomplishment. For example, certain solid thermoplastics may be melted to secure adhesive properties associated with the so-called hot-melt adhesives. Volatile liquids may be evaporated by heating the liquids to their vapor points. Gaseous and liquid materials may be heated to the temperature at which they become reactive in particular chemical reactions. Curable resins may be heated to the temperature at which chemical crosslinking occurs.

Thus, this invention may be used to activate heat-activatable adhesives such as the various thermoplastic hot-melt adhesives, for example, polymer-modified petroleum wax compositions. Particularly preferred polymer-modified petroleum wax compositions are those containing olefin polymers, such as homopolymers and copolymers of ethylene, propylene, isobutylene, etc., especially ethylene copolymers, that is, ethylene polymers containing one or more additional copolymerized monomer, such as ethylene/vinyl acetate, ethylene/ethyl acrylate, ethylene/1,4-hexadiene, ethylene/methyl methacrylate, ethylene/methacrylic acid, and the like. One preferred composition comprises 50 to 99.9% by weight petroleum wax, 0.1 to 50% by weight of an ethylene/vinyl acetate copolymer having a vinyl acetate content of 15 to 35% by weight and a melt index of 0.1 to 500, and 0 to 40% by weight of a resin, esterified resin, rosin or esterified rosin.

As is familiar to those skilled in the art, these heat-activatable adhesives are useful for adhering a variety of different types of substrates such as paper (including the so-called paperboard or cardboard), various metals, plastics, leather, glass, etc., either to like or different substrates. For example, by use of these heat-activatable adhesives in accordance with this invention one metal substrate can be adhered to another metal substrate, metal can be adhered to paper, paper to paper, leather to paper, and so forth. Consequently, in accordance with this invention there is provided a novel structure comprising a substrate having coated on at least a portion thereof a heat-activatable adhesive composition and a composition comprising the antiferromagnetic particles described hereinbefore.

This invention is especially useful for preparing cartons or other containers such as milk cartons, frozen food containers and the like, using such heat-activatable adhesives. By such a process, substrates such as carton or container blanks are provided with a coating of the heat-activatable adhesive, at least over the areas of the surfaces thereof to be adhered together. When the aforedescribed polymer-modified petroleum wax compositions are employed, the entire substrate is coated, at least on one side, to provide a protective barrier coating. The adhesive on at least one of the surfaces must be in intimate contact with the finely-divided multidomain antiferromagnetic particles. Thus, the particles may be in a physical admixture with the adhesive on one or both of the surfaces to be adhered. However, it is preferred to use the unique structure provided by this invention which comprises a paper (including the so-called paperboard and cardboard), substrate having coated on at least a portion of the surface thereof (i.e., at least on the areas of the surfaces to be adhered) a polymer-modified wax composition and a composition comprising multidomain nonconductive antiferromagnetic particles having particle sizes of less than 5 microns.

The coating comprising the antiferromagnetic particles is generally prepared from a dispersion of the particles and a binder such as a natural or synthetic resin or glue, preferably polyvinyl acetate, in a liquid dispersing medium or solvent for the binder such as a lower alcohol, such as methanol, ethanol, isopropanol, etc. This coating composition is applied to one or both of the surfaces to be adhered in the areas where adherence is desired. The topcoating is then applied at least over the areas covering the above-described coating comprising the antiferromagnetic particles, and preferably is applied to at least one entire surface of the substrate. The substrate is then folded, as desired, and is passed through the alternating magnetic field, with the surfaces to be adhered being in contact with each other. The particles are heated to the Néel temperature within milliseconds, and then cooled to a nontacky temperature also within milliseconds, thus permitting extremely fast mass production.

This invention may also be used to dry ordinary printing inks for use on high speed printing presses, whereby finely-divided antiferromagnetic particles are dispersed in the printing ink. Immediately after the substrate is printed, it is passed through an alternating magnetic field, causing the particles to heat and evaporate the solvent used in the ink, effecting virtually instantaneous drying of the ink, and permitting the printed substrates to be immediately stacked after printing. Moreover, since only the ink is heated, and since it is heated and then cooled all within a fraction of a second, the paper itself is not detectably heated. Thus, water which is inherently present in the paper, is not evaporated, thereby eliminating any possible shrinking of the paper.

Similarly, this technique can be employed with inks which contain an oxidizable liquid vehicle, such as the lithographic inks based upon linseed oil. By use of this invention the ink vehicle can be virtually instantaneously heated to the proper oxidizing temperature and then cooled, with the above-indicated advantages inherently accruing.

This invention also provides a technique for heating gases or liquids to proper temperature for reactions in chemical processes, by passing the gases or liquids through a fixed or fluid bed of finely-divided multidomain antiferromagnetic particles which are continually subjected to an alternating magnetic field. Such a process may be very effectively conducted where the particles are embedded in a catalyst support used in the process.

The following example serves to further illustrate this invention: A carton of the type generally described in U.S. Patent 2,695,745 was prepared by coating only the flap areas to be sealed of the carton with a composition comprising finely-divided, nonconductive, antiferromagnetic particles. This composition was prepared from a commercial ferrite consisting essentially of about 10%, by weight, NiO, 6% ZnO, 1% MnO and 83% $Fe_2O_3$, sold under the registered trademark or trade name Ceramag 11 by Stackpole Carbon Company, Electronic Components Division, St. Marys, Pa., and having a Néel temperature of 385° C., an initially permeability of 115, and a volume resistivity of $2.5 \times 10^7$ ohm-cm. at 30° C. This ferrite was ball-milled for about 16 hours in water. The mill slip was then filtered, dried and crushed to an average particle size of about 3 microns. The ferrite particles were then mixed with a 30% solution of polyvinyl acetate (molecular weight of 5000–20,000) in a mixture of methyl and ethyl alcohol, to obtain a composition containing 67% ferrite and 33% polyvinyl acetate solution, having a viscosity of 500–1000 centipoise. This composition was then coated on to the carton blank flaps as described above. The entire carton blank was then coated with an ethylene/vinyl acetate-paraffin wax composition. The carton blank was folded and positioned on a mandrel, adjacent to an electrode structure in the pressure pad. A 60–80 megacycle per second alternating magnetic field of 125 gauss was generated. The coating on the flaps reached its sealing temperature within 100 milliseconds, whereupon the alternating magnetic field was disrupted, and the surfaces of the adjacent flaps in contact with each other cooled to room temperature and fused together within 200 milliseconds. No external cooling of the mandrel or pressure pad was required. Strong, paper-tearing, nonleaking bonds were obtained. The coating did not melt elsewhere on the carton. A durable carton was formed.

By repeating the foregoing example using a flux density of 200 gauss, the coating on flaps reached its sealing temperature within 20 milliseconds, at which time the alternating magnetic field was disrupted, and the surfaces of the adjacent flaps in contact with each other cooled to room temperature within 100 milliseconds. Again, strong, paper-tearing, nonleaking bonds were obtained; the coating did not melt elsewhere on the carton; and a durable carton was formed.

Although this invention has been described in considerable detail, those skilled in the art will recognize many alterations and variations of these details which may be made without departing from the spirit and scope of this invention. Accordingly, it will be understood that this invention is not intended to be limited except as defined by the following claims.

I claim:

1. The process comprising heating a heat-activatable material comprising contacting said material with finely-divided multidomain antiferromagnetic particles having an electrical resistance of at least $10^{-2}$ ohm-cm. and while in contact, subjecting said material and said particles to an alternating magnetic field having a frequency of at least 10 megacycles per second.

2. The process of claim 1 wherein the said particles are less than about 5 microns in size.

3. The process of claim 2 wherein the said field has a flux density of at least 50 gauss.

4. The process of claim 3 wherein the said particles are ferrites.

5. The process of heating a heat-activatable material comprising contacting said material with multidomain antiferromagnetic particles having an electrical resistance of at least $10^{-2}$ ohm-cm. and particle sizes of about 0.1–5 microns and while in contact, subjecting said material and particles to an alternating magnetic field having a frequency of 40 to 2500 megacycles per second and a flux density of 100 to 300 gauss.

6. The process of claim 5 wherein said particles are ferrites.

7. The process of adhering together at least two surfaces wherein at least one of said surfaces is coated with a heat-activatable adhesive at least on the area to be adhered, and at least one of said surfaces is coated with a composition comprising finely-divided multidomain antiferromagnetic particles on the area to be adhered, said particles having an electrical resistance of at least $10^{-2}$ ohm-cm. and a sufficient Néel temperature to activate said adhesive, said process comprising contacting said surfaces to be adhered and while in contact, subjecting said surfaces to an alternating magnetic field having a frequency of at least 10 megacycles.

8. The process of claim 7 wherein the said particles are less than about 5 microns in size.

9. The process of claim 8 wherein the said field has a flux density of at least 50 gauss.

10. The process of claim 9 wherein the said particles are ferrites.

11. The process of claim 10 wherein the said heat-activatable adhesive is a polymer-modified petroleum wax composition.

12. The process of adhering together at least two paper surfaces wherein at least one of said surfaces is coated with a polymer-modified wax composition at least on the area to be adhered, and at least one of said surfaces is coated on the area to be adhered with a composition comprising multidomain antiferromagnetic particles having an electrical resistance of at least $10^{-2}$ ohm-cm. and particle sizes of about 0.1–5 microns, said process comprising contacting said surfaces to be adhered and while in contact, subjecting said surfaces to an alternating magnetic field having a frequency of 40–2500 megacycles per second and a flux density of 100 to 300 gauss.

13. The process of claim 12 wherein the said particles are ferrites.

14. The process of claim 13 wherein the said polymer-modified petroleum wax composition comprises 50 to 99.9% by weight of petroleum wax, 0.1 to 50% by weight of an ethylene/vinyl acetate copolymer having a vinyl acetate content of 15 to 35% by weight and a melt index of 0.1 to 500, and 0 to 40% by weight of a member of the group consisting of resins, esterified resins, rosins and esterified rosins.

15. A structure adapted for heat activated adherence on exposure to an alternating magnetic field at a frequency of at least 10 megacycles comprising a substrate having coated on at least a portion of the surface thereof a heat-activatable adhesive composition in contact with finely-divided multidomain antiferromagnetic particles having an electrical resistance of at least $10^{-2}$ ohm-cm.

16. The structure of claim 15 wherein the said particles are less than about 5 microns in size.

17. The structure of claim 16 wherein the said particles are ferrites.

18. A structure comprising a paper substrate having coated on at least a portion thereof a polymer-modified wax composition in contact with multidomain antiferromagnetic particles having an electrical resistance of at least $10^{-2}$ ohm-cm. and particle sizes of less than 5 microns.

19. A paper carton blank having coated on the end flaps thereof to be adhered, a composition comprising multidomain antiferromagnetic particles having an electrical resistance of at least $10^{-2}$ ohm-cm. and particle sizes of less than 5 microns, and having coated on at least the side thereof which comes into contact with the end flaps coated with said particles, a polymer-modified petroleum wax composition.

20. The paper carton blank of claim 19 wherein the said polymer-modified petroleum wax composition comprises 50 to 99.9% by weight petroleum wax, 0.1 to 50% by weight of an ethylene/vinyl acetate copolymer having a vinyl acetate content of 15 to 35% by weight and a melt index of 0.1 to 500, and 0 to 40% by weight of a member of the group consisting of resins, esterified resins, rosins and esterified rosins.

References Cited

UNITED STATES PATENTS

| | | | |
|---|---|---|---|
| 2,087,480 | 7/1937 | Pitman | 219—47 |
| 2,280,771 | 4/1942 | Dufour et al. | 117—93.1 |
| 2,364,790 | 12/1944 | Hemming | 219—10.41 |
| 2,922,865 | 1/1960 | Schattler et al. | 210—10.41 |
| 3,001,891 | 9/1961 | Stoller | 117—93.2 |
| 3,181,765 | 5/1965 | Bonzagni et al. | 229—3.5 |
| 3,249,658 | 5/1966 | Hodges | 264—25 |

OTHER REFERENCES

Gurevich, A. G., Ferrites at Microwave Frequencies, Consultants Bureau, N.Y., 1963 (Russian text published 1960), pp. 1 and 19.

EARL M. BERGERT, *Primary Examiner.*

W. E. HOAG, *Assistant Examiner.*